United States Patent [19]

Reynolds

[11] Patent Number: 5,495,980

[45] Date of Patent: Mar. 5, 1996

[54] PROTECTIVE LINING METHOD AND APPARATUS FOR ARCUATE CONTAINER WALLS

[76] Inventor: Steve Reynolds, 2406 Citation Ave., Owensboro, Ky. 42301

[21] Appl. No.: 321,450

[22] Filed: Oct. 12, 1994

[51] Int. Cl.$^6$ .................................................. B23K 37/04
[52] U.S. Cl. ........................ 228/184; 228/44.3; 228/213
[58] Field of Search ................................... 228/184, 212, 228/213, 44.3

[56] References Cited

U.S. PATENT DOCUMENTS 4,230,255  10/1980  Coulter ................................ 228/212 X
4,235,361  11/1980  Hays et al. .......................... 228/212 X
4,600,139   7/1986  Murase ................................... 228/184

Primary Examiner—Kenneth J. Ramsey
Attorney, Agent, or Firm—Terrance L. Siemens

[57] ABSTRACT

A method and apparatus for the lining of rounded arcuate chamber areas is disclosed. One edge of a flexible, rectangular sheet of lining material is attached to the substrate wall of the chamber by welding. The opposite end from the now attached side is compressed laterally to bow the sheet into contact with the wall. Keeper welds or attachments are made, trapping the compressive force. The installers are now free to complete the seam welds around the periphery of the sheet. In the preferred embodiment, the sheet is made of a high nickel alloy (HNA) and the arcuate chamber is a desulfurization duct or absorber tower. Successive sheets are overlapped approximately one inch on the sides and top/bottom.

5 Claims, 2 Drawing Sheets

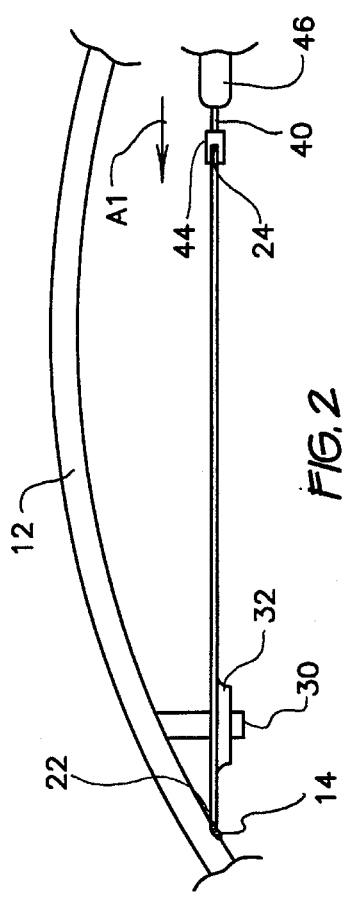
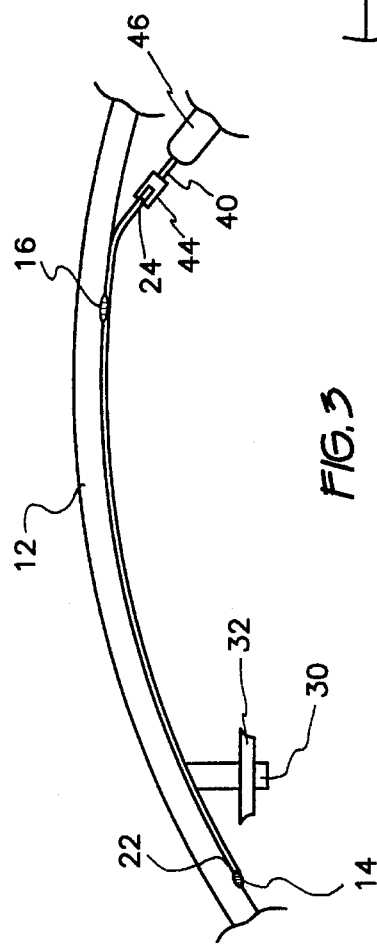
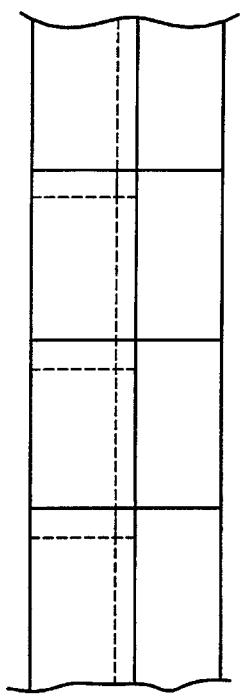

PROTECTIVE LINING METHOD AND APPARATUS FOR ARCUATE CONTAINER WALLS

BACKGROUND OF THE INVENTION

1. Field of the Invention

The present invention relates to the lining of arcuate chambers. More specifically, it relates to a novel method and apparatus for attaching a lining to an arcuate chamber that reduces the amount of stress on the lining material during and after the installation process. Even more specifically, it relates to a lining method and apparatus for sheet material wherein one end is fastened down to the chamber wall, compressive force is applied to bow the sheet such that it is in substantially complete contact with the wall of the chamber, and the compressive force is locked into the sheet by welding before removing the force applicator. Additionally, the successive sheets are overlapped to completely cover the surface of the chamber. More generally, the present invention serves as an improvement over existing methods for sheeting or "wallpapering" the inside of a cylindrical tank or column to protect the shell of the structure from corrosive, frictional, or other types of degradation.

Thus it can be seen that the potential fields of use for this invention are myriad and the particular preferred embodiment described herein is in no way meant to limit the use of the invention to the particular field chosen for exposition of the details of the invention.

A comprehensive listing of all the possible fields to which this invention may be applied is limited only by the imagination and is therefore not provided herein. Some of the more obvious applications are mentioned herein in the interest of providing a full and complete disclosure of the unique properties of this previously unknown general purpose article of manufacture. It is to be understood from the outset that the scope of this invention is not limited to these fields or to the specific examples of potential uses presented hereinafter.

2. Description of the Prior Art

There are many applications where the main body or substrate of a chamber is covered by a sheeting or protective surface. An example of such an application is the interior of absorber towers, flue gas desulfurization ductwork and the like. The substrate material, carbon steel for instance in the case of an absorber tower, needs to be covered with a protective HNA (High Nickel Alloy) sheeting or "wallpaper" over the interior surface of the tower to protect the material from the corrosive gasses generated by the process. Presently, this is accomplished in two different, yet basically similar ways in which the sheet is supported at the proper location by clips or the like and then plug welded (usually two to three inches center to center) to the substrate. The sheet is then manually pushed in and spot tacked around its outer edges. The horizontal and vertical seams are then welded. These types of methods leads to a large amount of stress distributed about the protective sheet, which in turn can shorten the useful lifespan of the sheathing, requiring expensive replacement or repair. Additionally, this process is very labor intensive and still does not provide the final results required for (FGD) projects. The present invention seeks to address the flaws inherent in this standard method of installation by providing an alternative method of attaching or fitting the HNA sheeting to the carbon steel substrate. One side of the HNA sheeting is held in place and a vertical weld is made along a seam. Compressive force is then applied to the opposite end of the sheeting, distal from the welded end, and this force causes the sheet to "bow" up against the substrate. Keeper welds, which trap the compressive force into each sheet, are applied prior to removing the force applicator. The sheet can then be fixed in place through seam welds about its periphery and no plug welds are required. During a search at the U.S. Patent and Trademark Office, a number of patents were uncovered that relate to this field and they are discussed hereinafter:

U.S. Pat. No. 3,702,058 issued to Seratino De Corso et al. on Nov. 7, 1972 discloses a double wall combustion chamber. In this, the combustion chambers are spaced angularly and concentrically to one another. This is dissimilar from the present invention in that no sheeting or "wallpapering" of the wall substrate is shown.

In U.S. Pat. No. 3,595,550 issued to Robert Greer on Jul. 27, 1971 there is disclosed a furnace lining. In this patent, there are a pair of refractory tiles spaced apart to provide an airgap between them. These tiles are held by support members inwardly from the furnace casing or framework. Contrast this to the present invention wherein the HNA or other protective sheathing material is pressed up to be substantially completely in contact with the substrate before being fixed in place.

U.S. Pat. No. 4,875,339 issued to Neil S. Rasmussen et al. on Oct. 24, 1989 discloses a combustion chamber liner insert. The inserts are placed in the combuster liner air admission hole. This is clearly dissimilar from the present invention in that there is no teaching of lateral compression of sheeting material to bow it to the inner surface of an arcuate chamber wall.

In U.S. Pat. No. 4,489,920 issued to William R. Jones on Dec. 25, 1984 there is disclosed a hot zone chamber wall arrangement. A plurality of ceramic tiles include beveled edges to interengage one another. Support panels hold the tiles in place. As in the Rasmussen patent above, however, there is no teaching of the lateral compression directed at the lining sheet.

Lastly, U.S. Pat. No. 5,139,239 issued to Kenneth T. Eccleston discloses a lining for molten metal handling vessels. Removable material is placed on the surface of the vessel and an expendable slurry lining is applied over that. The removable lining can then be taken out, or it may be heat consumable. Contrast this to the present invention wherein the sheet or lining material is substantially in complete contact with the substrate material to which it is being applied. on As will be seen, the simplicity and effectiveness of my invention is not rivaled in the prior art.

None of the above inventions and patents, taken either singly or in combination, is seen to describe the instant invention as claimed.

SUMMARY OF THE INVENTION

Briefly, the invention comprises a method and apparatus for the lining of rounded arcuate chamber areas. A rectangular sheet of lining material is attached to the substrate wall of the chamber by welding. The opposite end from the now attached side is compressed laterally to bow the sheet into contact with the wall. Keeper welds or attachments are made, trapping the compressive force. The force applicator is then removed. The installers are now free to complete the seam welds around the periphery of the sheet. In the preferred embodiment, the sheet is made of a high nickel alloy (HNA) and the arcuate chamber is a desulfurization duct or absorber tower. Successive sheets are overlapped approximately one inch on the sides and top/bottom.

Accordingly, it is a principal object of the invention to provide a new and improved apparatus and method for the protective lining of arcuately walled chambers which overcomes the disadvantages of the prior art in a simple but effective manner.

It is a major object of this invention to provide an apparatus and method for protective lining that minimizes the amount of stress on the lining material as it is being formed to the arcuate substrate, thus prolonging the life of the lining.

It is another object of the invention to provide an apparatus and method for protective lining wherein intimate contact, when provided between the substrate and the lining material, is provided without the need for multiple spot tacks.

It is another object of the invention to provide an apparatus and method for the protective lining of arcuate substrate wherein the sheeting can be seam welded without the potential for imperfections caused by welding over spot tacks.

Yet another object of the invention is to provide an apparatus and method for the protective lining wherein the possibility of a spot tack weld being broken from the heat of the seam weld is obviated.

Still yet another object of the invention is to provide a method and apparatus for protective lining of arcuate substrate which is faster and safer than the current methods presently used in the field.

Finally, it is a general goal of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 2 is a top view similar to FIG. 1.

FIG. 3 is a top view after compression is applied and the sheet bows to meet the substrate.

FIG. 4 is a view of a sheeted or lined wall showing the overlaps of the successive sheets.

DETAILED DESCRIPTION OF THE PREFERRED EMBODIMENTS

Figure 1:
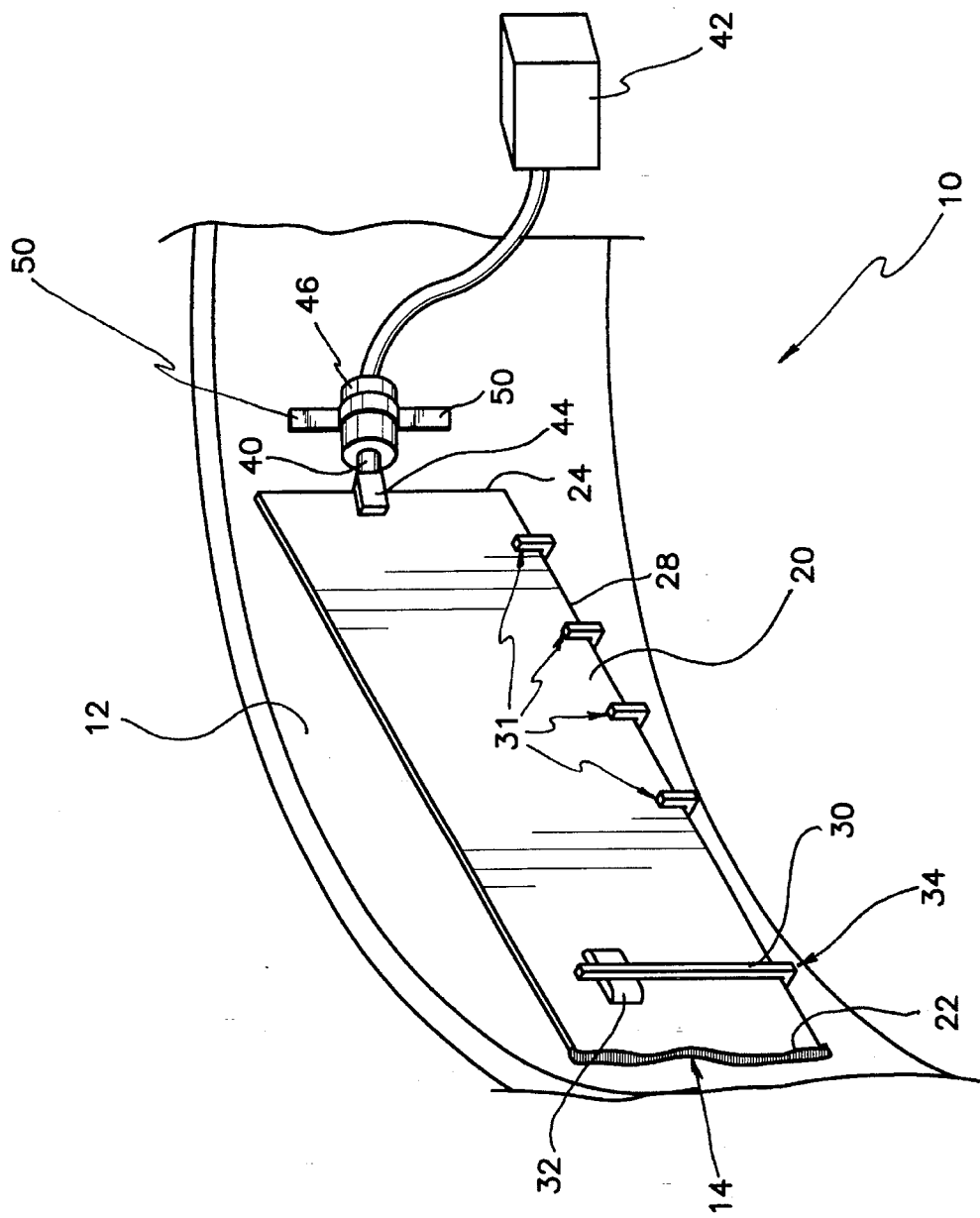
FIG. 1 is a perspective view of the present invention with the sheet placed on the clips and one edge ready to be pressed in and welded to the arcuate substrate before the lateral compression is applied.

The instant invention is indicated in FIG. 1 generally at 10. Lining sheet 20 which, in the preferred embodiment, is a sheet of high nickel alloy (HNA) metal with a width of approximately one quarter to one sixteenth of an inch, is shown with a first edge 22 pressed to the arcuate substrate surface 12. By using the portable press 30, this first edge 22 is then welded along the vertical seam as indicated at 14. During this first step of the lining; installation procedure, the sheet 20 is at the appropriate elevation by multiple clips 31, also shown in FIG. 1. The portable press 30 preferably has a sheet engaging area 32 that can be adjusted to hold the edge 22 of sheet 20 firmly in place against the arcuate substrate 12. Though the portable press 30 is shown as being removably attachable to the substrate wall 12 at 34, it should be understood that other immobilizing means could be used. People could simply hold the sheet 20 in place while it was being attached, or else a different type of support (not shown) could be temporarily attached to the floor (not shown) of the chamber. The present invention only requires that one edge 22 of the sheet 20 be placed in proximity to the substrate surface 12 for the first welding operation to take place. After this welding operation has taken place, the situation is as represented in FIG. 2. The sheet 20 is now ready to receive the lateral compressive force. This is imparted to sheet 20 by force impartation means which, in the embodiment described herein, is a hydraulically powered piston 40 connected to a source of hydraulic power 42. The source of power 42 could be a hand pump, electrical, gasoline, diesel, or other source of power to provide hydraulic pressure. At the end of the hydraulic piston 40 is a C shaped channel 44 that engages the second edge 24 of the sheet 20. The hydraulic power source is actuated, moving the piston 40 and the C shaped channel 44 in the direction as indicated by arrow A1 in FIG. 2. The piston housing 46 (as can be clearly seen in FIG. 1) is held immobile by straps 50 attaching it to the substrate wall 12, or other immobilization means could be used. Thus the sheet 20, held by the seam weld 14, the clips 31, and portable press 30 bows inwardly as shown in FIG. 3 until the point where the sheet 20 contacts the substrate surface 12 substantially completely along the length of side 26 and 28 of the sheet 20. Two keeper welds 16 are made proximate the second edge 24 of the sheet 20 along its top 26 and the bottom 28 (best seen in FIG. 1). One of these keeper welds 16 on the top edge 26 of the sheet 20 is shown in FIG. 3. It should be understood that the other keeper weld 16 is similar, being located on the bottom edge 28 of the sheet 20. Preferably, these keeper welds are approximately two inches (2") long. This has proved sufficient so that after they are made, the hydraulic force applicator can be removed and the sheet 20 stays in substantially complete contact with the arcuate substrate surface 12. Seam welds can now be made completely around the peripheral edges 24, 26, 28 of sheet 12, fixing it securely to the wall. Note that in FIG. 3, the second edge 24 is held in a placed apart relationship with regard to the substrate surface 12. This is due to the interposition of the C shaped channel 44 therebetween. As can be understood through FIG.3, due to the keeper weld 16 placement, when the C-shaped channel 44 is removed, second edge 24 will "snap" into place in contact with the substrate 12.

The sheet 12 is fastened completely in place and subsequent sheets are overlapped: i.e. the first edge 22 of a subsequent sheet overlays the second edge 24 of the first sheet. This overlapping arrangement is clearly seen in FIG. 4. In the case of a cylindrical chamber to be "wall papered" or sheathed, the user or users would sheath the circumference of the chamber and in the next series of sheets (assuming that they are working from the top down), their top edges 26 would overlap the bottom edges 28 of the first set of sheets. It is envisioned that these overlaps would be approximately one inch (1"). Thus, the entire chamber can be systematically covered with a substantial saving of time and with minimal risk of the spot welds of the prior art method of sheathing coming loose from heat and/or stress.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

I claim:

1. An apparatus for the lining of an arcuate container wall with flexible, planar, rectangular sheet material comprising:

positioning means for placing said sheet material such that one first end of said sheet material is proximate the arcuate container wall;

attachment means for fixedly attaching said one first end of said sheet material to said arcuate container wall;

force application means for applying a compressive force to a second end of said sheet material, said second end being distal from said first end, thus bowing said sheet material such that substantially complete contact is made between a side of said sheet material and the arcuate container wall; whereby said attachment means is used to completely seal the periphery of said sheet to the arcuate container wall as said sheet lies in contact therewith.

2. The apparatus according to claim 1, wherein said attachment means is a welding kit.

3. The apparatus according to claim 2, wherein said sheet material is a high nickel alloy.

4. The apparatus according to claim 3, wherein the force application means is a hydraulic piston, a source of hydraulic pressure and a means for sheet material edge engagement attached to said piston.

5. A method of attaching flexible, planar, rectangular sheet material to an arcuate container wall comprising the steps of:

positioning said sheet such that a first edge of said sheet is proximate the container wall;

attaching said first edge fixedly to the container wall;

applying compressive force on a second edge of said sheet, where said second edge is distal and opposite to said first edge such that said flexible sheet bows to bring a side of said sheet into substantially completely contact with the arcuate container wall;

attaching at least one additional peripheral portion of said sheet to said arcuate container wall such that said sheet is held in the bowed position brought about by said force application step;

removing said compressive force;

attaching all unattached portions of said periphery of said sheet to said arcuate container wall.

* * * * *